United States Patent
Fang et al.

(10) Patent No.: US 11,347,564 B2
(45) Date of Patent: May 31, 2022

(54) SYNCHRONIZING BATCH JOB STATUS ACROSS NODES ON A CLUSTERED SYSTEM

(71) Applicant: Red Hat, Inc., Raleigh, NC (US)

(72) Inventors: Cheng Fang, Westford, MA (US); Ingo Arnold Weiss, Farnborough (GB)

(73) Assignee: Red Hat, Inc., Raleigh, NC (US)

(*) Notice: Subject to any disclaimer, the term of this patent is extended or adjusted under 35 U.S.C. 154(b) by 60 days.

(21) Appl. No.: 16/393,334

(22) Filed: Apr. 24, 2019

(65) Prior Publication Data
US 2020/0341820 A1    Oct. 29, 2020

(51) Int. Cl.
| | |
|---|---|
| G06F 9/46 | (2006.01) |
| G06F 9/50 | (2006.01) |
| G06F 9/52 | (2006.01) |
| G06F 12/0842 | (2016.01) |
| G06F 9/48 | (2006.01) |
| G06F 1/3228 | (2019.01) |

(52) U.S. Cl.
CPC ............... *G06F 9/52* (2013.01); *G06F 9/461* (2013.01); *G06F 9/5027* (2013.01); *G06F 12/0842* (2013.01); *G06F 1/3228* (2013.01); *G06F 9/485* (2013.01); *G06F 9/5066* (2013.01)

(58) Field of Classification Search
None
See application file for complete search history.

(56) References Cited

U.S. PATENT DOCUMENTS

| | | | |
|---|---|---|---|
| 7,010,617 B2 | 3/2006 | Kampe et al. | |
| 7,716,061 B2* | 5/2010 | Keohane | G06Q 10/06 705/1.1 |
| 7,769,844 B2* | 8/2010 | Miller | H04L 67/10 709/224 |
| 8,996,469 B2* | 3/2015 | Bigney | G06F 9/5061 707/661 |
| 2002/0161814 A1* | 10/2002 | Wical | G06F 11/2097 718/101 |
| 2004/0193461 A1* | 9/2004 | Keohane | G06Q 10/06 705/1.1 |

(Continued)

OTHER PUBLICATIONS

Massimo Mezzadri et al.; "Job submission and control on a generic batch system: the BLAH experience"; Journal of Physics: Conference Series 331; Publication Year: 2011; (6 pages).

(Continued)

*Primary Examiner* — Abu Zar Ghaffari
(74) *Attorney, Agent, or Firm* — K&L Gates LLP

(57) ABSTRACT

Systems and method for determining and synchronizing an execution status of a batch job are provided. In one embodiment, a method is provided that includes checking a local cache of a node for a local status of the batch job. If the local status is a terminal status, the method may proceed with determining that the terminal status is the execution status of the batch job. If the local status is a non-terminal status, the method may proceed with determining whether the node is actively processing at least a portion of the batch job. If the node is actively processing at least a portion of the batch job, the method may determine a currently processing status as the execution status. If not, the method may proceed with querying a repository for the execution status.

18 Claims, 10 Drawing Sheets

(56) References Cited

U.S. PATENT DOCUMENTS

| | | | |
|---|---|---|---|
| 2006/0020911 A1* | 1/2006 | Lyons | G06F 9/526 717/101 |
| 2006/0080389 A1* | 4/2006 | Powers | G06F 9/5072 709/203 |
| 2006/0168584 A1* | 7/2006 | Dawson | G06F 11/3495 718/104 |
| 2008/0307258 A1* | 12/2008 | Challenger | G06F 11/1482 714/20 |
| 2010/0161549 A1* | 6/2010 | Plancarte | G06F 9/4843 707/608 |
| 2010/0333094 A1* | 12/2010 | Restall | G06F 9/5027 718/102 |
| 2011/0131579 A1* | 6/2011 | Tsukamoto | G06Q 40/04 718/101 |
| 2011/0145830 A1* | 6/2011 | Yamaguchi | G06F 9/52 718/104 |
| 2011/0276396 A1* | 11/2011 | Rathod | H04L 51/066 705/14.49 |
| 2013/0232164 A1* | 9/2013 | Bigney | G06F 9/5061 707/769 |
| 2013/0247050 A1* | 9/2013 | Watanabe | G06F 11/3433 718/101 |
| 2013/0346986 A1* | 12/2013 | Goetz | G06F 9/485 718/102 |
| 2014/0149982 A1* | 5/2014 | Asayag | G06F 9/45533 718/1 |
| 2014/0373016 A1* | 12/2014 | Ruggiero | G06F 9/46 718/101 |
| 2017/0024258 A1* | 1/2017 | Reid | G06F 9/4843 |
| 2018/0129570 A1* | 5/2018 | Sirota | G06F 9/485 |

OTHER PUBLICATIONS

Paolo Andreeto; "BLAH User's Guide"; cream-guide.readthedocs.io/en/latest/BLAH_Guide.html; Publication Year: 2017; Retrieval Date Feb. 24, 2019; (29 pages).

MicroStrategy, Inc.; "Synchronizing cached information across nodes in a cluster"; microstrategy.com/producthelp/10.11/SystemAdmin/WebHelp/Lang_1033/Content/ynchronizing_cached_information_across_nodes_in . . . ; Publication Year: 2018; Retrieval Date Feb. 22, 2019; (5 pages).

Oracle; "Managing Performance Tuning and Query Caching"; docs.oracle.com/en/; Publication Year: 2018; Retrieval Date Feb. 22, 2019; (54 pages).

* cited by examiner

SYNCHRONIZING BATCH JOB STATUS ACROSS NODES ON A CLUSTERED SYSTEM

BACKGROUND

Batch jobs may be performed to automate one or more computer tasks. For example, batch jobs may be generated to automate computer tasks at regular intervals. The automated tasks may include long-running tasks, such as data analysis on large databases. In particular, in certain implementations, batch jobs may be used to automate tasks on a weekly, daily, or hourly basis.

SUMMARY

The present disclosure presents new and innovative methods and systems for synchronizing batch job status. In one embodiment, a method that includes checking, at a node, a local cache of the node for a local status of a batch job, responsive to the local status indicating a terminal status for the batch job, determining the terminal status as an execution status of the batch job, and/or, responsive to the local status indicating a non-terminal status for the batch job, determining whether the node is actively processing at least a portion of the batch job. The method may further include, responsive to determining that the node is actively processing the batch job, determining a currently processing status as the execution status of the batch job and, responsive to determining that the node is not actively processing the batch job, retrieving job status data from a repository and determining the execution status of the batch job from the job status data.

In another embodiment, a node is provided that includes a local cache, a processor, and a memory. The memory may store instructions which, when executed by the processor, cause the processor to check the local cache for a local status of a batch job and, responsive to the local status indicating a terminal status for the batch job, determine the terminal status as an execution status of the batch job. The memory may also store further instructions which, when executed by the processor, cause the processor to, responsive to the local status indicating a non-terminal status for the batch job, determine whether the node is actively processing at least a portion of the batch job and, responsive to determining that the node is actively processing the batch job, determine a currently processing status as the execution status of the batch job. The memory may store still further instructions which, when executed by the processor, cause the processor to, responsive to determining that the node is not actively processing the batch job, retrieve job status data from a repository and determine the execution status of the batch job from the job status data.

In a further embodiment, a non-transitory, computer-readable medium is provided storing instructions which, when executed by a processor, cause the processor to check, via a node, a local cache of the node for a local status of the batch job, responsive to the local status indicating a terminal status for the batch job, determine the terminal status as an execution status of the batch job, and/or, responsive to the local status indicating a non-terminal status for the batch job, determine whether the node is actively processing at least a portion of the batch job. The non-transitory, computer-readable medium may store further instructions which, when executed by the processor, cause the processor to, responsive to determining that the node is actively processing the batch job, determine a currently processing status as the execution status of the batch job, and, responsive to determining that the node is not actively processing the batch job, retrieve job status data from a repository and determine the execution status of the batch job from the job status data.

In yet another embodiment, a system is provided that includes a plurality of nodes comprising at least a first and second node, wherein the plurality of nodes are configured to execute batch jobs and a repository configured to store job status data regarding batch jobs. The first node may be configured to receive, from a user, a request for an execution status of a batch job and transmit the request for the execution status of the batch job to the second node. The second node may be configured to check a local cache of the second node for a local status of the batch job, determine that the local status indicates a terminal status of the batch job, determine that the node is not actively processing at least a portion of the batch job, and transmit a request for job status data to the repository. The repository may be configured to receive the request for job status data from the second node and transmit job status data to the second node indicating the execution status of the batch job.

In a still further embodiment, a method is provided that includes receiving, at a first node, a request for an execution status of a batch job, transmitting the request for the execution status the batch job to a second node, and receiving the request for the execution status at the second node. The method may further include checking a local cache of the second node for a local status of the batch job, determining that the local status indicates a terminal status of the batch job, and determining that the node is not actively processing at least a portion of the batch job. The method may still further include transmitting a request for job status data to a repository, receiving, at the repository, the request for job status data, and transmitting job status data of the batch job to the second node indicating the execution status of the batch job.

In another embodiment, a node is provided that includes a cache checking means configured to check a local cache of the node for a local status of a batch job and a terminal status checking means. The terminal status checking means may be configured to determine whether the local status indicates a terminal status of the batch job, and responsive to determining that the local status indicates the terminal status, determine the terminal status as an execution status of the batch job. The node may also include an active processing checking means configured, responsive to the local status indicating a non-terminal status of the batch job, to determine whether the node is actively processing the batch job and, responsive to determining that the node is actively processing the batch job, determine a currently processing status as the execution status of the batch job. The system may further include a repository retrieval means configured, responsive to the active processing checking means determining that the node is not actively processing the batch job, to retrieve job status data from a repository and determine the execution status of the batch job from the job status data.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
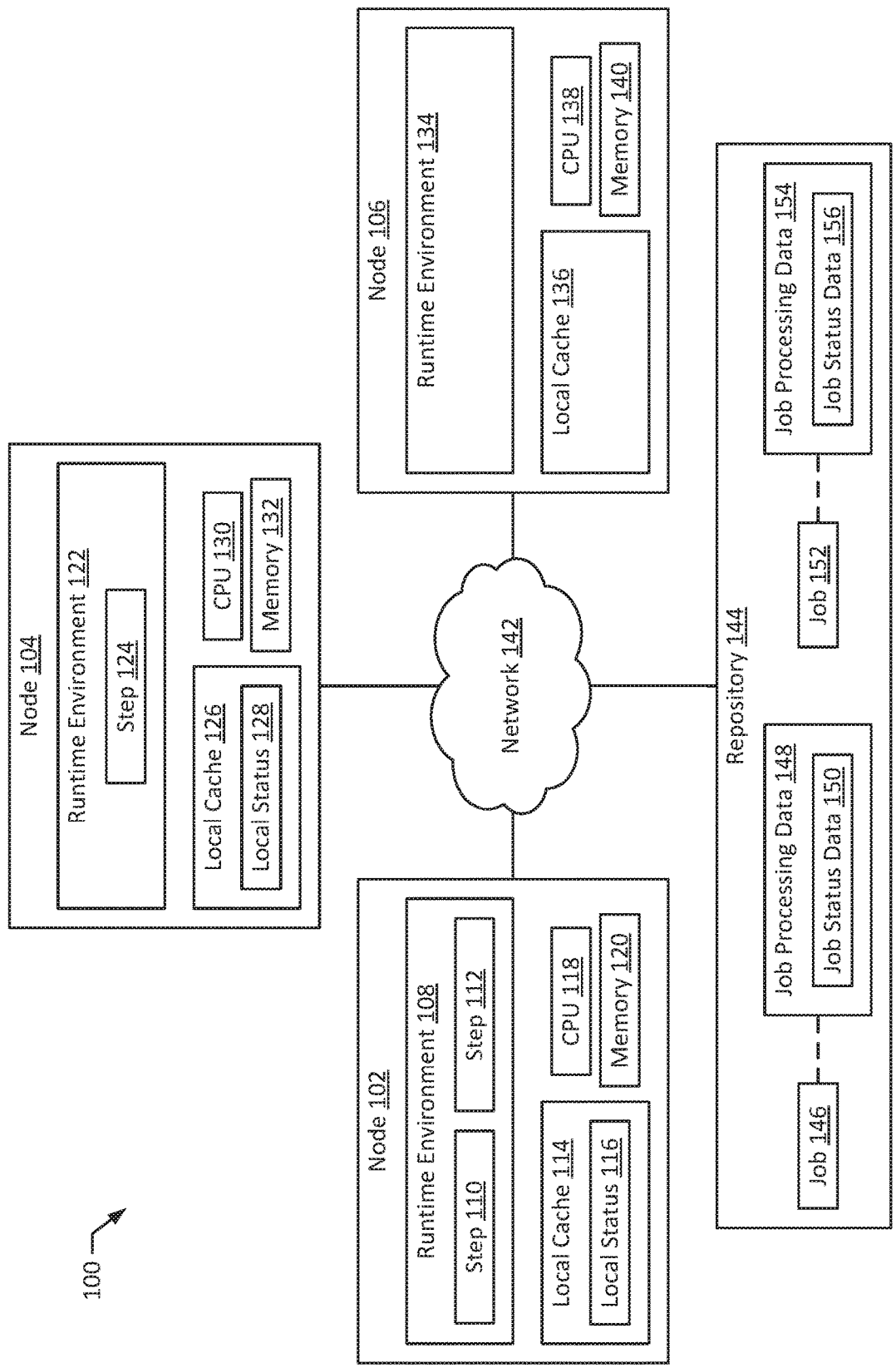
FIG. 1 illustrates a system according to an exemplary embodiment of the present disclosure.

In batch processing systems, multiple nodes may be used to execute the batch jobs. In such systems, a batch job repository may be used to store data regarding the execution of one or more scheduled batch jobs. However, while executing batch jobs, the nodes may also maintain a local cache reflecting the current status of the job being executed by the nodes. The local cache may enable faster read times by removing the need for the nodes to contact and retrieve job status data from the batch job repository.

In situations where multiple nodes are executing the same batch job, it may be necessary for each node to have frequent, accurate access to the overall job execution status that incorporates the current status of the other nodes executing the same batch job. Therefore, it may be necessary to frequently synchronize job status data regarding the batch job between the nodes. Similarly, a user may request the current status of the batch job (e.g., to monitor and/or manage system performance). The request may be provided to a node of the batch processing system, and accurately responding to the user's request may require that the receiving node have access to a synchronized batch job status, informed by the one or more nodes executing the batch job.

Conventional systems may handle such situations by always requesting job status data from the batch job repository. However, even in the best case, communications between nodes and the batch job repository can be significantly slower than other system-level communications. Accordingly, responding to these situations by querying the batch job repository may cause both response delays and may tie up system resources that may be used to process other operational requests from nodes executing batch jobs. In other implementations, conventional systems may handle these situations by referring to the local cache (e.g., local cache of each node executing a batch job, or the local cache of the node receiving the user request). However, because each node's local cache is locally maintained, the job status maintained in each local cache may be out of date or stale in instances where multiple nodes executing the batch job continue execution after another node has stopped. Similarly, if a node receiving a user status request did not participate in execution of the corresponding batch job, the receiving node may be unable to respond to the request based solely on a local cache. In still further implementations, conventional systems may also periodically refresh the local caches of the nodes at regular intervals (e.g., based on an age of the cache). However, such implementations may still create unnecessary queries to the repository and cannot ensure that the local cache contains up-to-date information.

One way to solve these problems is to confirm the accuracy of the local status and, if the local status is up-to-date, use the local status to determine the execution status of the job. In particular, the accuracy of the local status may be verified by determining whether the local status indicates a terminal status for the job and/or confirming whether the node whose local status is being checked is actively processing the job. In either case, the local status may necessarily be up-to-date and it may therefore not be necessary to query the repository. However, if the local status is not up-to-date, the globally-synchronized status may be retrieved from the repository. By verifying the local status before querying the repository, unnecessary queries can be avoided, improving response time from the faster local cache while also freeing up network and repository resources by reducing request volume to the repository over the network. Further, because the repository is used to buttress situations where the local cache does not have an up-to-date status, this solution is still able to ensure accuracy of the determined statuses.

FIG. 1 depicts a system 100 according to an exemplary embodiment of the present disclosure. The system 100 may be configured to synchronize and maintain job status data for one or more jobs executed by nodes and to fulfill requests for the execution status of the jobs. The system 100 includes a repository 144 and nodes 102, 104, 106 connected by a network 142. The nodes 102, 104, 106 each include local caches 114, 126, 136, runtime environments 108, 122, 134, CPUs 118, 130, 138, and memories 120, 132, 140. The repository includes jobs 146, 152 and job processing data 148, 154 associated with each job 146, 152. Each job processing data 148, 154 includes job status data 150, 156.

The CPUs 118, 130, 138 and the memories 120, 132, 140 may implement one or more aspects of the nodes 102, 104, 106, such as the local caches 114, 126, 136 and/or the runtime environments 108, 122, 134. For example, the memories 120, 132, 140 may store instructions which, when executed by the CPUs 118, 130, 138, may perform one or more of the operational features of the nodes 102, 104, 106. Similarly, although not depicted, the repository 144 may include one or more CPUs and/or memories configured to implement one or more operational features of the repository 144.

Each node 102, 104, 106 may be configured to execute batch jobs, such as the jobs 146, 152. For example, the jobs 146, 152 may be executed by one or more nodes 102, 104, 106, as discussed further below. The nodes 102, 104, 106 may execute batch jobs in the runtime environments 108, 122, 134. In particular, the nodes 102, 104 may execute steps 110, 112, 124 in the runtime environments 108, 122. For example, the node 102 may be executing steps 110, 112 of the job 146 and the node 104 may be executing step 124 of the job 152. In another example, the steps 110, 112, 124 may be from the same job 146, 152. Although not depicted, in certain implementations, the nodes 102, 104, 106 may execute the same step 110, 112, 124 (e.g., while executing the same job 146, 152 on differing subsets or shards of a dataset). While executing the jobs 146, 152, the nodes 102, 104 may maintain a local status 116, 128 indicating a local execution status of the job 146, 152 being executed by the node 102, 104. The local status 116, 128 may include information regarding a current step 110, 112, 124 of the jobs 146, 152 being executed. For example, where the node 102 includes multiple steps 110, 112 in the runtime environment 108, the local status 116 may identify the specific step 110, 112 being executed. In alternative implementations, the local status 116, 128 may indicate an execution status for each step 110, 112, 124 within the runtime environment 108, 122. For example, the local statuses 116, 128 may indicate one or more of a completed status, a stopped status, a failed status, an abandoned status, a starting status, a started status, and a stopping status for each step 110, 112, 124.

The node 106 is not executing a job 146, 152. Accordingly, the runtime environment 134 does not include any steps 110, 112, 124 and the local cache 136 does not include a local status 116, 128. Idle nodes such as the node 106 may be used to execute new jobs 146, 152, or may be added to the current execution of other jobs 146, 152. In still further implementations, idle nodes 106 may receive requests from users for updates regarding the current execution status of one or more jobs 146, 152 within the repository 144, although such requests may also be received by nodes 102, 104 that are executing jobs 146, 152 in certain implementations. When an idle node 106 receives the request, the node 106 may query other, processing nodes 102, 104 regarding the status of the job 146, 152. In certain implementations, the idle node 106 may query nodes 102, 104 processing a specified job 146, 152.

The repository 144 stores both the jobs 146, 152 and job processing data 140, 154 for the jobs 146, 152. Each job 146, 152 may include one or more instructions for performance by the nodes 102, 104, 106 when executing the job 146, 152. For example, as discussed above, each job 146, 152 may include one or more steps 110, 112, 124. These steps 110, 112, 124 may be provided to each node 102, 104, 106 assigned to execute the jobs 146, 152. The job processing data 140, 154 may include information regarding the execution of each job 146, 152. For example, the job processing data 140, 154 includes job status data 150, 156. The job status data 150, 156 may reflect the current job execution status of the associated job 146, 152. For example, the job status data 150, 156 may indicate an execution status of the job 146, 152 overall and/or an execution status for each step 110, 112, 124 of the job 146, 152. In certain implementations, the execution status may include one or more of a completed status indicating that execution has been successfully completed, a stopped status indicating that execution has been stopped but may be resumed, a failed status indicating that execution encountered an error and has stopped permanently, and an abandoned status indicating that execution has been abandoned (e.g., at the direction of a user or system). In certain implementations, the execution status may also include one or more of a starting status indicating that execution of the job 146, 152 or step 110, 112, 124 is beginning, a started status indicating that the execution has successfully started and is currently being executed, and a stopping status indicating that execution of the job 146, 152 or step 110, 112, 124 is stopping (e.g., while transitioning to a completed status, a stopped status, a failed status, or an abandoned status).

In certain implementations, idle nodes 106 may be able to read and access job status data 150, 156 regarding the jobs 146, 152, while processing nodes 102, 104 may be configured to read and update the job status data 150, 156. In particular, the nodes 102, 104 may be configured to periodically update the job status data 150, 156 for the jobs 146, 152 they are executing. For example, the nodes 102, 104 may update the job status data 150, 156 at regular time intervals (e.g., every 5 minutes, every 1 minute), or may update the job status data 150, 156 when requested to do so by the repository 144 or a system administration routine. In still further implementations, the nodes 102, 104 may update the job status data 150, 156 each time the local status 116, 128 in the local cache 114, 126 changes. As another example, the nodes 102, 104 may update the job status data 150, 156 after processing a certain amount of data (e.g., after processing every 100, 1,000, or 10,000 rows of data).

The repository 144 and the nodes 102, 104, 106 are connected by the network 142. The network 142 may be implemented as one or more wired or wireless networks, such as one or more private or public networks. In certain implementations, the network 142 may be implemented by the Internet and/or by a local network connection. The nodes 102, 104, 106 and the repository 144 may connect to the network by one or more wired or wireless connections (e.g., Ethernet connections, W-Fi connections, Bluetooth connections, cellular data connections). In certain implementations, the nodes 102, 104, 106 may not communicate with one another via the network 142. For example, the nodes 102, 104, 106 may be locally connected and may communicate with the repository 144 via the network 142.

Figure 2:
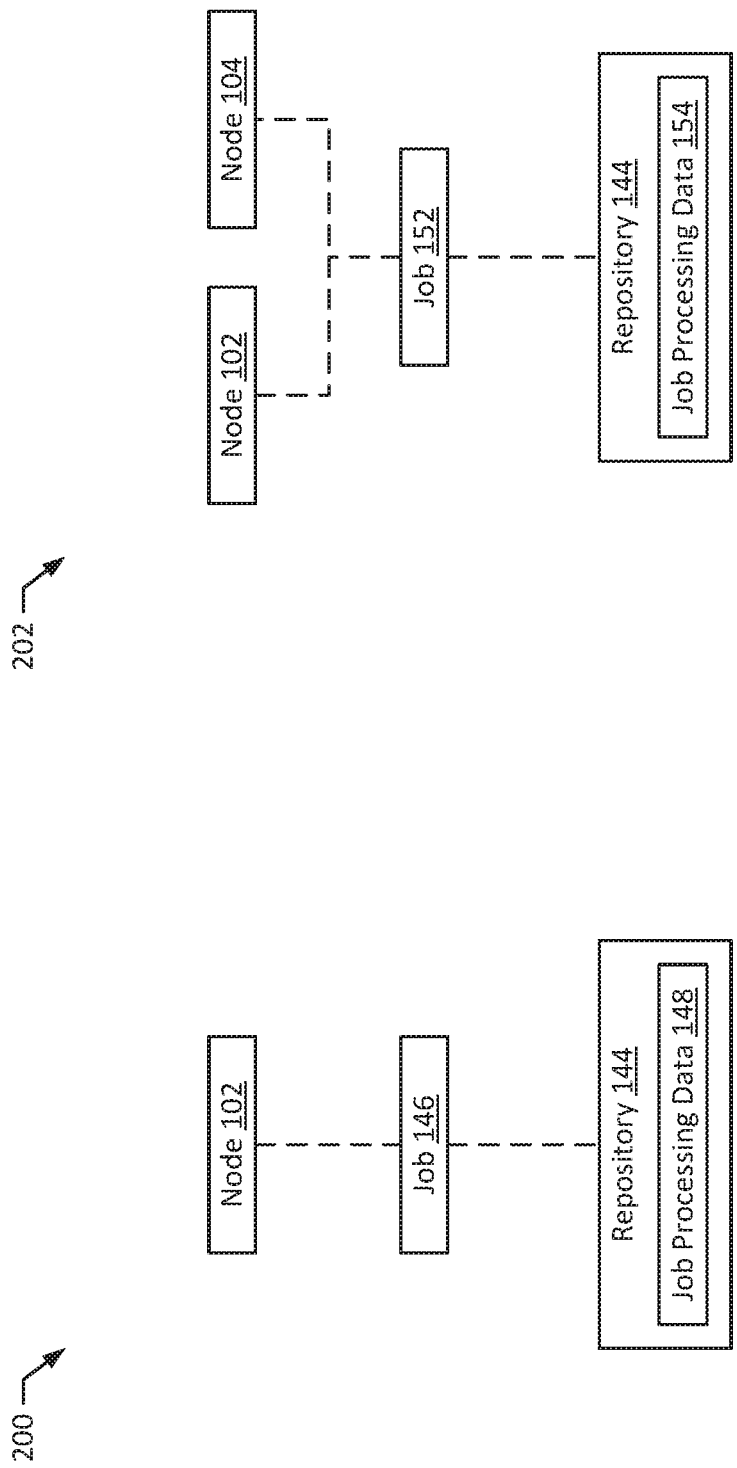
FIGS. 2A-2B illustrate node associations according to exemplary embodiments of the present disclosure.

FIGS. 2A and 2B depict node associations 200, 202 according to exemplary embodiments of the present disclosure. The node associations 200, 202 may depict exemplary execution scenarios for the jobs 146, 152 by the nodes 102, 104. For example, the node association 200 depicts the job 146 being executed by a single node 102. During this execution, the runtime environment 108 may include one or more (e.g., a subset of, or all of) the steps 110, 112 of the job 146. When executing the job 146, the node 102 may maintain and update a local status 116 in a local cache 114, reflecting an execution status of the job 146. Because the job 146 is executed by a single node 102, the local status 116 may represent a comprehensive and up-to-date version of the current execution status of the job 146. Accordingly, the job processing data 148 may be periodically updated to include job status data 150 indicative of the local status 116 of the node 102.

The node association 202 depicts the job 152 being executed by two nodes 102, 104. During the execution, the runtime environments 108, 122 of each node 102, 104 may include steps 110, 112, 124 of the job 152. In certain implementations, each node 102, 104 may execute the same steps of the job 152. For example, if the job 152 is performed to analyze data (e.g., sales and inventory data) and generate a summary report, each node 102, 104 may analyze a certain subset of the data. In particular, the node 102 may analyze the first half of the data and the node 104 may analyze the second half of the data. Once analysis of the data is completed by both nodes 102, 104, one of the nodes 102, 104 may proceed with generating the summary report. As a further example, if the node 102 completes its data analysis before the node 104, the node 102 may wait for the node 104 to complete its data analysis before proceeding to generate the summary report. In certain implementations, additional nodes may be added to the execution of the job 152 between steps 110, 112, 124. For example, after the node 102 completes the step 110, the node 104 may be added to the job 152 to execute step 112 in combination with the node 102. Nodes 102, 104, 106 may similarly be removed from execution of the jobs 146, 152 between steps 110, 112, 124.

When executing the job 152, the nodes 102, 104 may update their respective local statuses 116, 128. The nodes 102, 104 may then update the corresponding job status data 150, 156 of the job processing data 148, 154. For example, the job status data 156 may store an execution status for the steps 110, 112, 124 performed by each node 102, 104. The nodes 102, 104 may update the corresponding execution statuses in the job status data 156. In the previous example, the nodes 102, 104 may each update the execution status of the data analysis step 110, 112, 124 in the job status data 156 upon completing the data analysis step 110. Accordingly, if the node 102 completes its data analysis first, the node 102 may update the corresponding execution status to a completed status in the job status data 156 and may wait for the node 104 to update its corresponding execution status of the job status data 156 to a completed status before proceeding with generating the summary report at step 112.

As another example, the job 152 may include two data analysis steps 110, 124 on differing datasets. Accordingly the nodes 102, 104 may each perform one of the data analysis steps 110, 124 on a separate dataset. The job 152 may include a third step 112 that comprises generating a report based on the analyses of each dataset in the preceding steps 110, 124. Accordingly, one of the nodes 102 may perform the third step 112 and may need to ensure that the other node 104 completes its data analysis step 124 prior to proceeding on to generating the report at step 112. Accordingly, each node 102, 104 may update the execution status of its corresponding step 110, 124 in the job status data 156 corresponding to the job 152. Then, prior to proceeding on to execute step 124, the node 102 may query the job status data 156 (e.g., at regular intervals) until the current execution status of the step 124 indicates a completed status.

Figure 3:
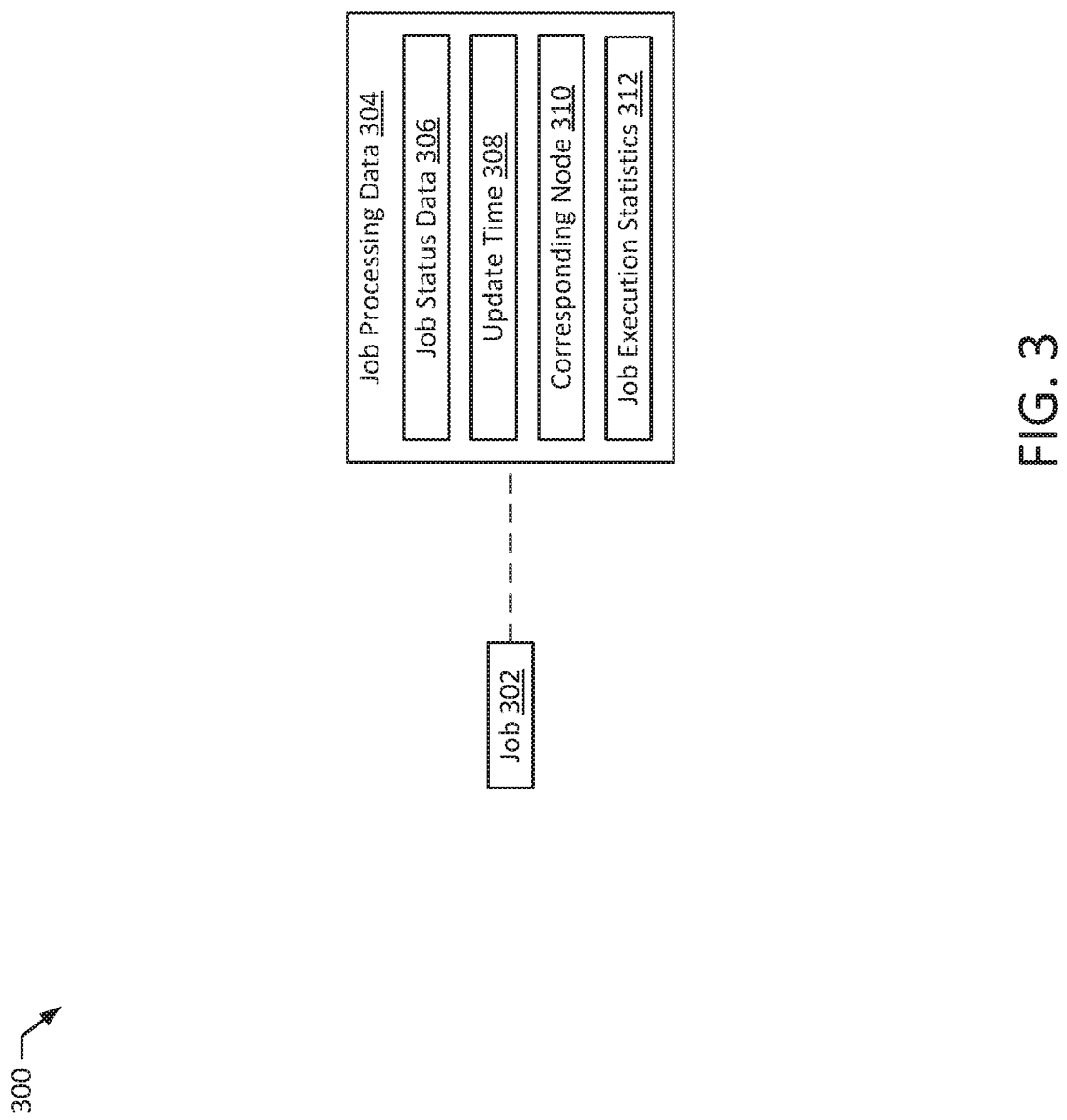
FIG. 3 illustrates a job processing data association according to an exemplary embodiment of the present disclosure.

FIG. 3 illustrates a job processing data association 300 according to an exemplary embodiment of the present disclosure. The job processing data association 300 includes a job 302 and associated job processing data 304. The job 302 may be an exemplary implementation of one or both of the jobs 146, 152 and the job processing data 304 may be an exemplary implementation of the job processing data 148, 154.

The job processing data 304 includes job status data 306, which may include an execution status of the job 302, such as an execution status of one or more steps 110, 112, 124, as explained above. The job processing data 304 also includes an update time 308, a corresponding node 310, and job execution statistics 312. The update time 308 may include a last time of update for the job status data 306. In implementations where a single node 102 executes the job 302, the update time 308 may reflect the last time at which the node 102 updated the job status data 306. In implementations where multiple nodes 102, 104 execute the job 302, the update time 308 may reflect the last time at which one or each of the nodes 102, 104 updated the job processing data 154. The update time 308 may also reflect the time at which other portions of the job processing data 304 were updated, such as the corresponding node 310 and/or the job execution status 312.

The corresponding node 310 may store an indication of the node or nodes 102, 104 that are executing the job 302. In implementations where more than one node 102, 104 execute the job 302, the corresponding node 310 may also store an indication of the steps 110, 112, 124 executed or being executed by each node 102, 104.

The job execution statistics 312 may store one or more statistics regarding the current or previous executions of the job 302. For example, the job execution statistics 312 may include statistics such as a current execution percentage completion of the job 312, a current execution percentage completion of steps 110, 112, 124 of the job 312, previous execution durations for the job 302 and/or associated steps 110, 112, 124, a failure percentage for execution of the job 302 and/or associated steps 110, 112, 124, and an abandonment percentage of the job 302 and/or associated steps 110, 112, 124.

Figure 4:
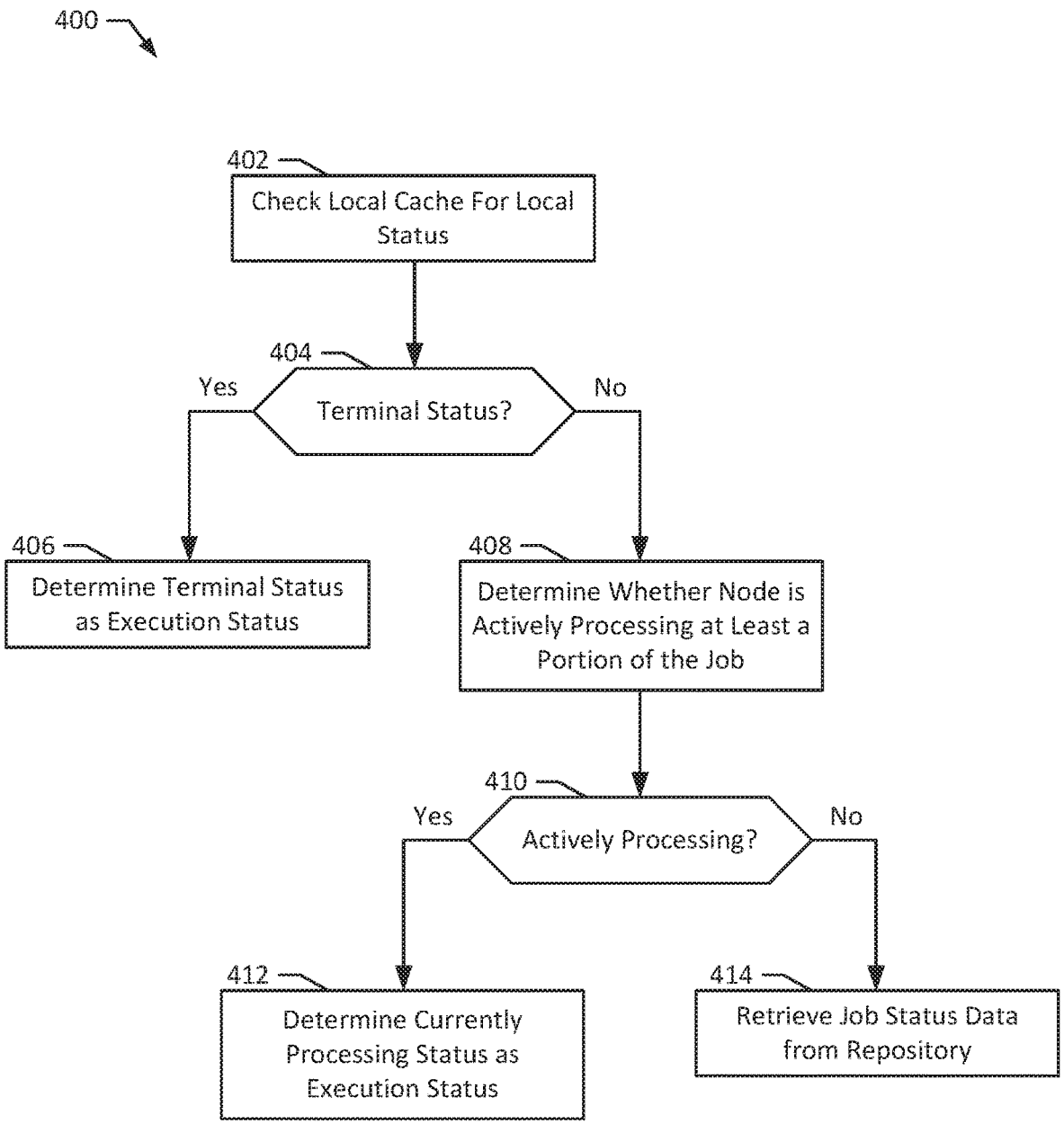
FIG. 4 illustrates a method for determining the execution status of a job according to an exemplary embodiment of the present disclosure.

FIG. 4 depicts a method 400 according to an exemplary embodiment of the present disclosure. The method 400 may be performed to determine the execution status of a job 146, 152, 302. For example, the method 400 may be performed by a node 102, 104, 106 to determine the execution status in response to a request (e.g., in response to a request from a user and/or a system process) or in response to being added to execution of the job 146, 152, 302. The method 400 may be implemented on a computer system, such as the system 100. For example, the method 400 may be implemented by the nodes 102, 104, 106 and/or the repository 144. The method 400 may also be implemented by a set of instructions stored on a computer readable medium that, when executed by a processor, cause the computer system to perform the method. For example, all or part of the method 400 may be implemented by the CPUs 118, 130, 138 and the memories 120, 132, 140. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 begins with checking a local cache for a local status (block 402). For example, the node 102, 104, 106 may check its local cache 114, 126, 136 for a local status 116, 128. In particular, if the method 400 is performed in response to receiving a user or system request, the node 102, 104, 106 may check its local cache 114, 126, 136 in response to receiving the request. Similarly, if the method 400 is performed in response to being added to the execution of a job 146, 152, 302, the node 102, 104, 106 may check the local cache 114, 126, 136 in response to being added to the execution of the job 146, 152, 302. To check the local cache 114, 126, 136, the node 102, 104, 106 may query the local cache for a local status 116, 128.

Although not depicted, if the node 102, 104, 106 determines that there is no local status 116, 128, then the node 102, 104, 106 may proceed with retrieving job status data 150, 156, 306 from the repository 144. For example, the node 106 is not executing a job 146, 152, 302 and therefore has no local status 116, 128 in the local cache 136. Accordingly, if the node 106 were to check the local cache 136 for a local status 116, 128, the node 106 would determine that no local status 116, 128 exists. Accordingly, the node 106 may retrieve job status data 150, 156, 306 from the repository 144 (e.g., via the network 142).

The node may then determine whether the local status indicates a terminal status (block 404). For example, the node 102, 104, 106 may determine whether the local status 116, 128 indicates a terminal status. In certain implementations, the local status 116, 128 may include one or more of a completed status, a stopped status, a failed status, an abandoned status, a starting status, a started status, and a stopping status. The node 102, 104, 106 may determine that the local status 116, 128 indicates a terminal status if the local status 116, 128 indicates one or more of completed status, a stopped status, a failed status, and/or an abandoned status for the job 146, 152. In implementations where the local status 116, 128 indicates the status of more than one step 110, 112, 124, the node 102, 104, 106 may determine that the local status 116, 128 indicates a terminal status if each step 110, 112, 124 has one of these statuses.

If the node determines that the local status indicates a terminal status, the node may determine the terminal status as the execution status of the job (block 406). For example, if the node 102, 104, 106 determines that the local status 116, 128 indicates a terminal status, the node 102, 104, 106 may determine the terminal status as the execution status of the job 146, 152, 302. In implementations where the method 400 is performed in response to a request, the node 102, 104, 106 may return the terminal status (e.g., the completed status, the stopped status, the failed status, and/or the abandoned status) to the requesting user or system process. In implementations where the method 400 is performed in response to the node 102, 104, 106 being added to the execution of the job 146, 152, 302, the node 102, 104, 106 may refrain from beginning to execute the job 146, 152, 302 because of the terminal status.

If the node determines that the local status does not indicate a terminal status, the node may determine whether the node is actively processing at least a portion of the job (block 408). For example, if the node 102, 104, 106 determines that the local status 116, 128 does not indicate a terminal status, the node 102, 104, 106 may determine whether the node 102, 104, 106 itself is actively processing at least a portion of the job 146, 152, 302. As explained further below, the node 102, 104, 106 may make the active processing determination based at least in part on an analysis of the runtime environment 108, 122, 134. For example, the node 102, 104, 106 may analyze the steps 110, 112, 124, or lack thereof, within the runtime environment 108, 122, 134.

If the node determines that the node is actively processing the job (block 410), the node may determine a currently processing status as the execution status of the job (block 412). For example, if the node 102, 104, 106 determines that the node 102, 104, 106 is actively processing the job 146, 152, 302, the node 102, 104, 106 may determine a currently processing status as the execution status of the job 146, 152, 302. In certain implementations, upon determining that the node 102, 104, 106 is actively processing the job 146, 152, 302, the node 102, 104, 106 may identify a currently processing status from among the starting status, the started status, and the stopping status. The node 102, 104, 106 may then return the currently processing status to the requesting user or system process in corresponding situations.

If the node determines that the node is not actively processing the job (block 410), the node may retrieve job status data from the repository (block 414). For example, if the node 102, 104, 106 determines that the node 102, 104, 106 is not actively processing the job 146, 152, 302, the node 102, 104, 106 may retrieve job status data 150, 156, 306 regarding the job 146, 152, 302 from the repository 144. For example, the node 102, 104, 106 may transmit a job status data request to the repository 144 via the network 142 identifying the job 146, 152, 302. In response, the repository 144 may provide all or part of the job processing data 148, 154, 304 related to the job 146, 152, 302. The node 102, 104, 106 may extract the job status data 150, 156, 306 from the job processing data 148, 154, 304. The node 102, 104, 106 may then determine the execution status of the job 146, 152, 302 based on the job status data 150, 156, 306. For example, as explained above, the job status data 150, 156, 306 may include information regarding an execution status of one or more steps 110, 112, 124 of the job 146, 152, 302 and may also include information regarding an execution status of one or more nodes 102, 104, 106 executing the job 146, 152, 302. The node 102, 104, 106 may analyze the job status data 150, 156, 306 to determine the execution status of the job 146, 152, 302. For example, if the job status data 150, 156, 306 indicates that one or more steps of the job are currently processing on one node, while another node 102, 104, 106 has completed execution of its steps (e.g., during a data analysis phase of a summary report generation job 146, 152, 302), the node 102, 104, 106 may determine that the job 146, 152, 302 is still currently processing. In another example, where job status data 150, 156, 306 received from the repository 144 indicates that execution of the job 146, 152, 302 has been completed by the executing nodes 102, 104, 106, the node 102, 104, 106 may determine a terminal status for the job 146, 152, 302. The node 102, 104, 106 may then return the determined execution status of the job 146, 152, 302 to a requesting user or system process if the method 400 is executed in response to receiving such a request. In certain implementations, the node 102, 104, 106 may, rather than determining a further execution status based on the job status data 150, 156, 306, return the received job status data 150, 156, 306 to the requesting user or process.

Figure 5A:
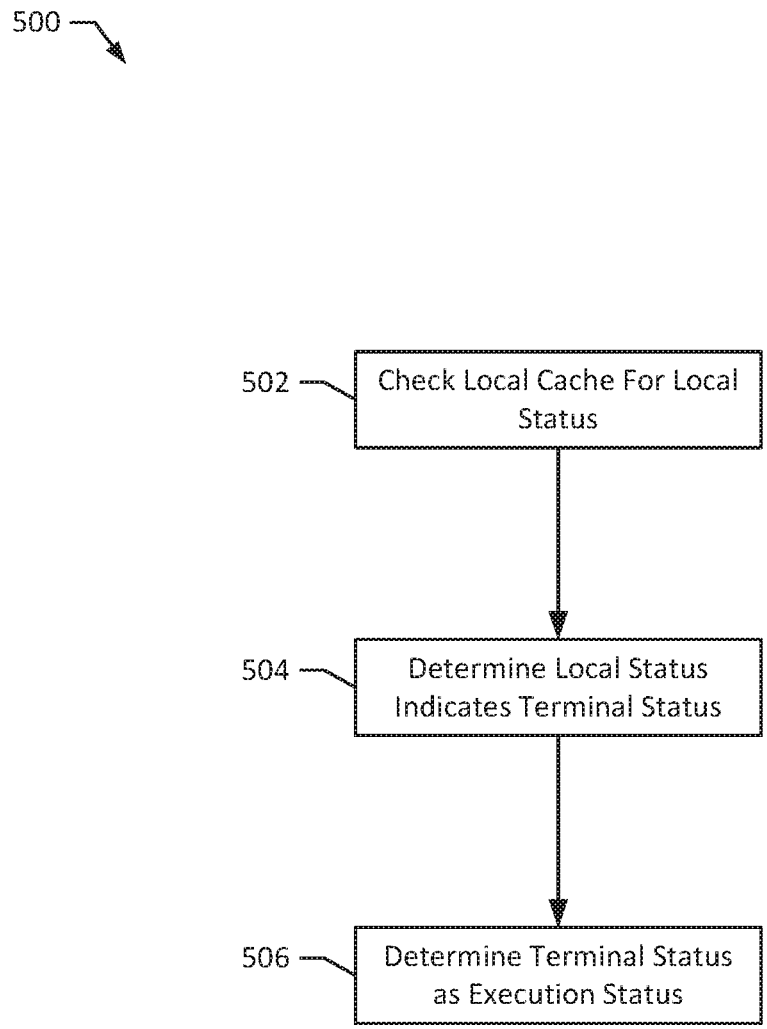
FIGS. 5A-5C illustrate methods for determining various execution statuses (e.g., terminal status, execution status, non-terminal status) for jobs according to exemplary embodiments of the present disclosure.
Figure 5B:
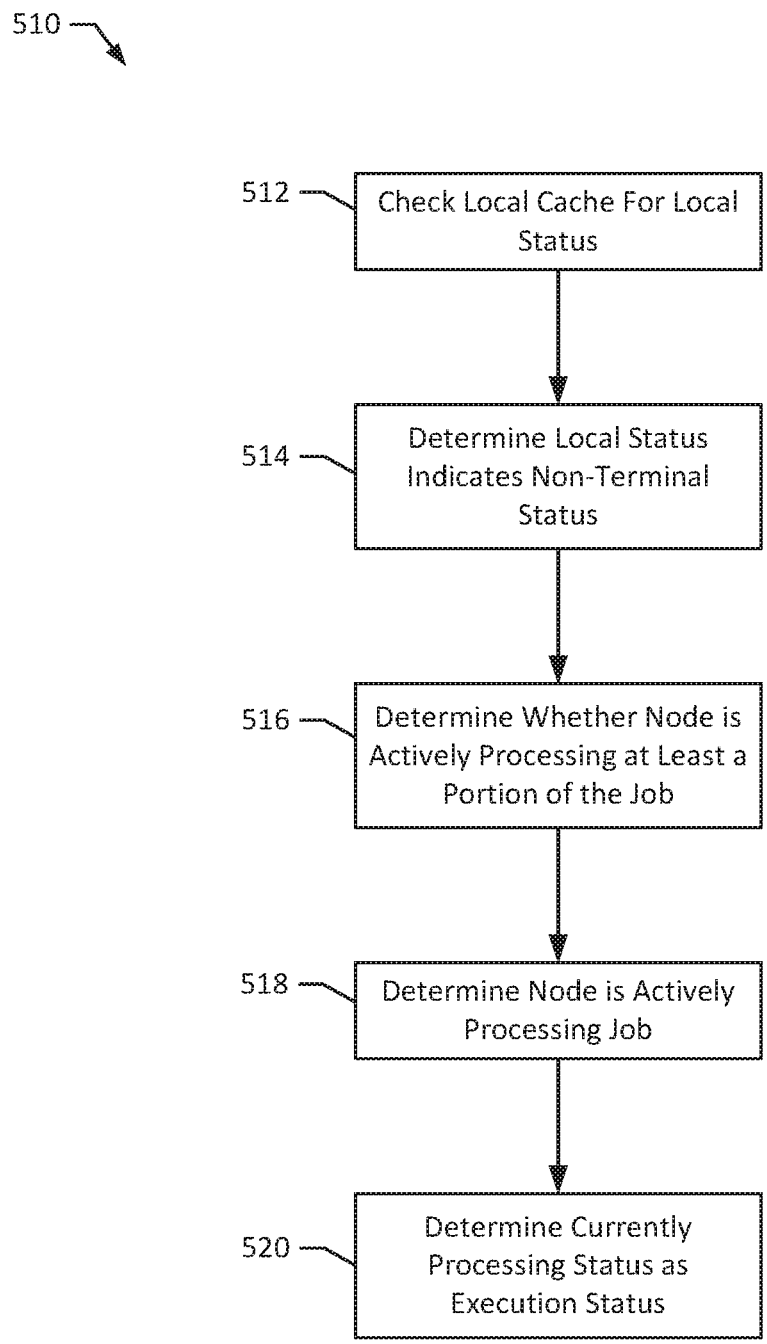
Figure 5C:
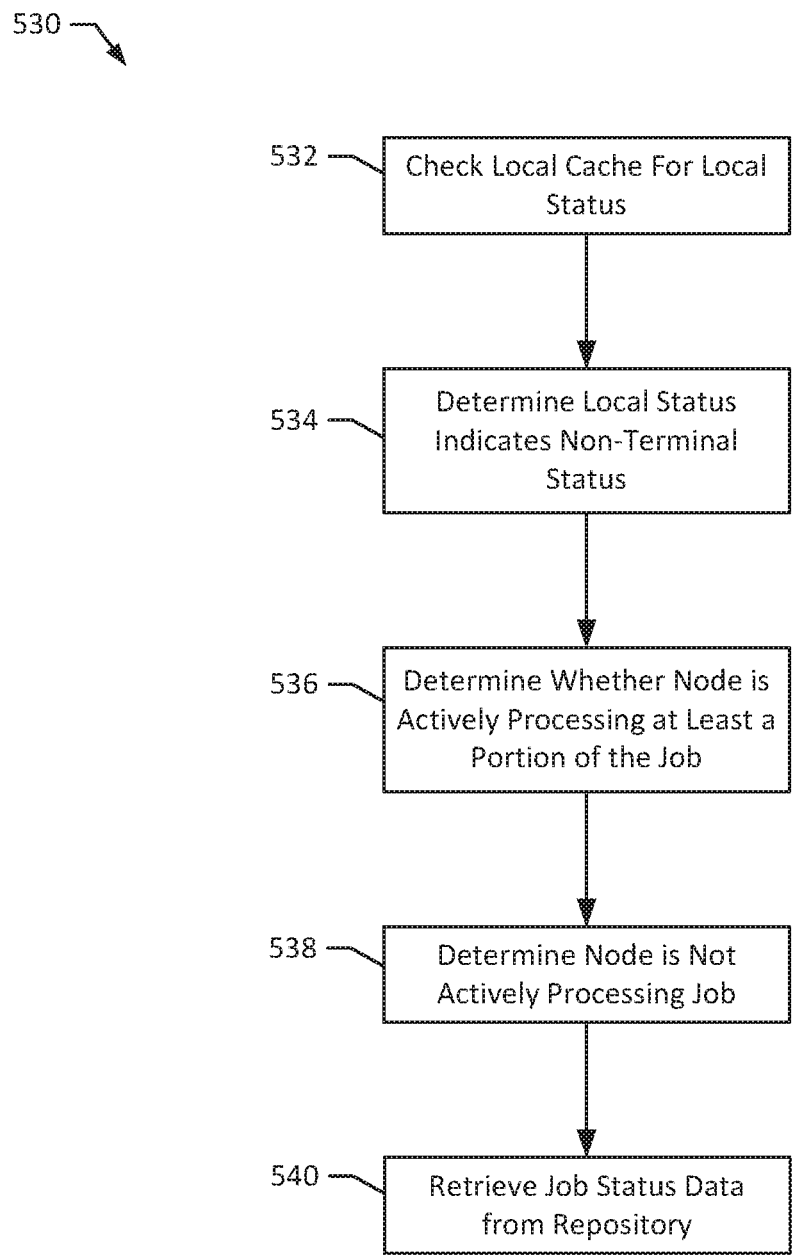

FIGS. 5A-5C depict methods 500, 510, 530 according to exemplary embodiments of the present disclosure. The methods 500, 510, 530 may be performed to determine the execution status of a job 146, 152, 302. For example, the methods 500, 510, 530 may be performed by a node 102, 104, 106 to determine the execution status in response to a request (e.g., in response to a request from a user and/or a system process) or in response to being added to execution of the job 146, 152, 302. In particular, the methods 500, 510, 530 may be exemplary instances of the method 400. The methods 500, 510, 530 may be implemented on a computer system, such as the system 100. For example, the methods 500, 510, 530 may be implemented by the nodes 102, 104, 106 and/or the repository 144. The methods 500, 510, 530 may also be implemented by a set of instructions stored on a computer readable medium that, when executed by a processor, cause the computer system to perform the method. For example, all or part of the methods 500, 510, 530 may be implemented by the CPUs 118, 130, 138 and the memories 120, 132, 140. Although the examples below are described with reference to the flowchart illustrated in FIGS. 5A-5C, many other methods of performing the acts associated with FIGS. 5A-5C may be used. For example, the order of some of the blocks may be changed, certain blocks may be combined with other blocks, one or more of the blocks may be repeated, and some of the blocks described may be optional.

In FIG. 5A, the method 500 begins with checking the local cache of a node for a local status of a job (block 502). For example, the node 102 may check the local cache 114 for the local status 116 with techniques similar to those discussed above in connection with block 402. If the node 102 completed execution of the steps 110, 112 of the job 146, the local status 116 may indicate a completed status for each step 110, 112 and for the job 146.

The node may then determine that the local status indicates a terminal status (block 504). For example, after retrieving the local status 116 from the local cache 114, the node 102 may determine that the local status 116 indicates a terminal status for the job 146 because it includes a completed status for the steps 110, 112 and for the job 146.

The node may then determine the terminal status as an execution status of the job (block 506). For example, the node 102 may accordingly determine that the completed status of the job 146 is the current execution status of the job 146. The node 102 may then return the completed status as the execution status in response to a request from the system or a user, if a request was received. Alternatively, if the method 500 is performed in response to the node 102 being added to the execution of the job 146, the node 102 may refrain from beginning execution the job 146 because execution was completed.

In FIG. 5B, the method 510 begins with checking the local cache of a node for a local status of a job (block 502). For example, the node 104 may check the local cache 126 for a local status 128 with techniques similar to those discussed above. If the node 104 is in the process of executing step 124 of the job 152, the local status 120 may indicate a started status for this step 124 and for the job 152.

The node may then determine that the local status indicates a non-terminal status (block 514). For example, because the local status 128 indicates a started status for the job 152 and for the step 124, the node 104 may determine that the job 152 has a non-terminal status.

The node may then determine whether the node is actively processing at least a portion of the job (block 516). For example, the node 104 may determine whether the node 104 is actively processing at least a portion of the job 152 using techniques discussed above in connection with block 408 of the method 400, and further detailed below in connection with the method 600. For example, the node 104 may analyze the step 124 within the runtime environment 122 to determine whether the node 104 is actively processing step 124 and the job 152.

Based on the analysis, the node may determine that the node is actively processing the job (block 518). For example, because the node 104 is actively processing step 124 of the job 152, the node 104 may determine that the job 152 is being actively processed by the node 104. For example, the node 104 may analyze the step 124 and realize that execution of the step 124 was recently begun and that the node 104 is accordingly still processing the step 124. Based on the step 124 still in process, the node 104 may determine that the corresponding job 152 is still being processed by the node 104.

Accordingly, the node may determine a currently processing status as the execution status of the job (block 520). For example, the node 104 may determine that the currently processing status (e.g., starting status) reflected in the local status 128 is the current execution status of the job 152. Accordingly, the node 104 may return the currently processing status in response to a request for the current execution status of the job 152 from the system or by a user. Alternatively, if the method 510 is performed in response to the node 104 being added to the execution of the job 152, the node 104 may determine that it has already begun executing the job 152 and may return an indication of the same. In performing the method 510, the node 104 may be able to quickly determine a current execution status of the job 152 without resorting to requesting job processing data 154 from the repository 144, which can create processing delays. In particular, accessing the local status 128 may be ten to one hundred times faster than querying the repository 144 for the job status data 156. In certain implementations, this speed savings may ultimately reduce overall status request processing time by 10% to 20%. Further, because the node has confirmed the accuracy of the local status 128 at blocks 514, 516, 518, these performance improvements can be realized while also ensuring that the local status 128 is accurate prior to relying on it as an indication of the current execution status of the job 152. Nodes executing the method 500 may experience similar benefits.

In FIG. 5C, the method 530 begins with checking the local cache of a node for a local status of the job (block 532). For example, the node 102 may check the local cache 114 for the local status 116 using techniques similar to those discussed above. If both nodes 102, 104 are executing different steps of the job 152, the local status 128 of the node 104 may indicate a status of the step 124 executed by the node 104, as well as an execution status of the job 152 executed overall by both nodes 102, 104. For example, both nodes 102, 104 may be executing the steps 110, 124 of the job 152 in parallel, but both steps 110, 124 must complete before the node 102 can proceed to step 112 of the job 152. Accordingly, if the node 104 completes the step 124, the local status 128 may indicate a completed status for the step 124, but may indicate a currently processing status (e.g., a started status) for the job 152 overall, because the node 102 must continue executing the job 152 with the step 112.

The node may then determine that the local status indicates a non-terminal status (block 534). For example, in the situation outlined above, the node 104 may indicate that the local status 120 indicates a non-terminal status for the job 152 because the local status 128 indicates a currently processing status of the job 152 overall.

The node may then determine whether the node is actively processing a least a portion of the job (block 536). For example, the node 104 may analyze the step 124 and the runtime environment 122, as explained in connection with the methods 400 and 600, to determine whether the node 104 is currently processing the job 152. For example, the node 104 may analyze an update time or execution status of the step 124 in the runtime environment 122.

The node may then determine that the node is not actively processing the job (block 538). For example, in the previously-described situation, because the step 124 has completed processing, the node 104 may determine that the node 104 is not actively processing the job 152. Accordingly, the local status 128 of the node 104 may be out of date.

The node may then accordingly retrieve job status data from the repository (block 540). For example, the node 104 may retrieve the job status data 156 and/or the job processing data 154 from the repository 144. The node 104 may then extract a current execution status from the job status data 156. For example, if, after the node 104 completed execution of the step 124 (and last updated its local status 128), the node 102 may complete execution of the step 112 of the job 152 and may accordingly have completed execution of the job 152 itself. The node 102 may then update the job status data 156 to indicate that the job 152 has been successfully executed (e.g., a completed status). The job status data 156 retrieved from the repository 144 by the node 104 may accordingly indicate this up-to-date status of the job 152. Accordingly, by performing the method 530, the node 104 is able to account for situations where the node 104 may have previously executed one or more steps 124 of a job 152, but no longer maintains an up-to-date local status 128. In this way, the node 104 only resorts to the slower procedure of accessing the repository 144 when necessary. Such implementations may reduce network congestion, as nodes 102, 104, 106 do not have to consult the repository 144 for up-to-date execution statuses of jobs 146, 152, 302 in every instance, or at regular intervals, but only when such consultation is necessary.

Figure 6:
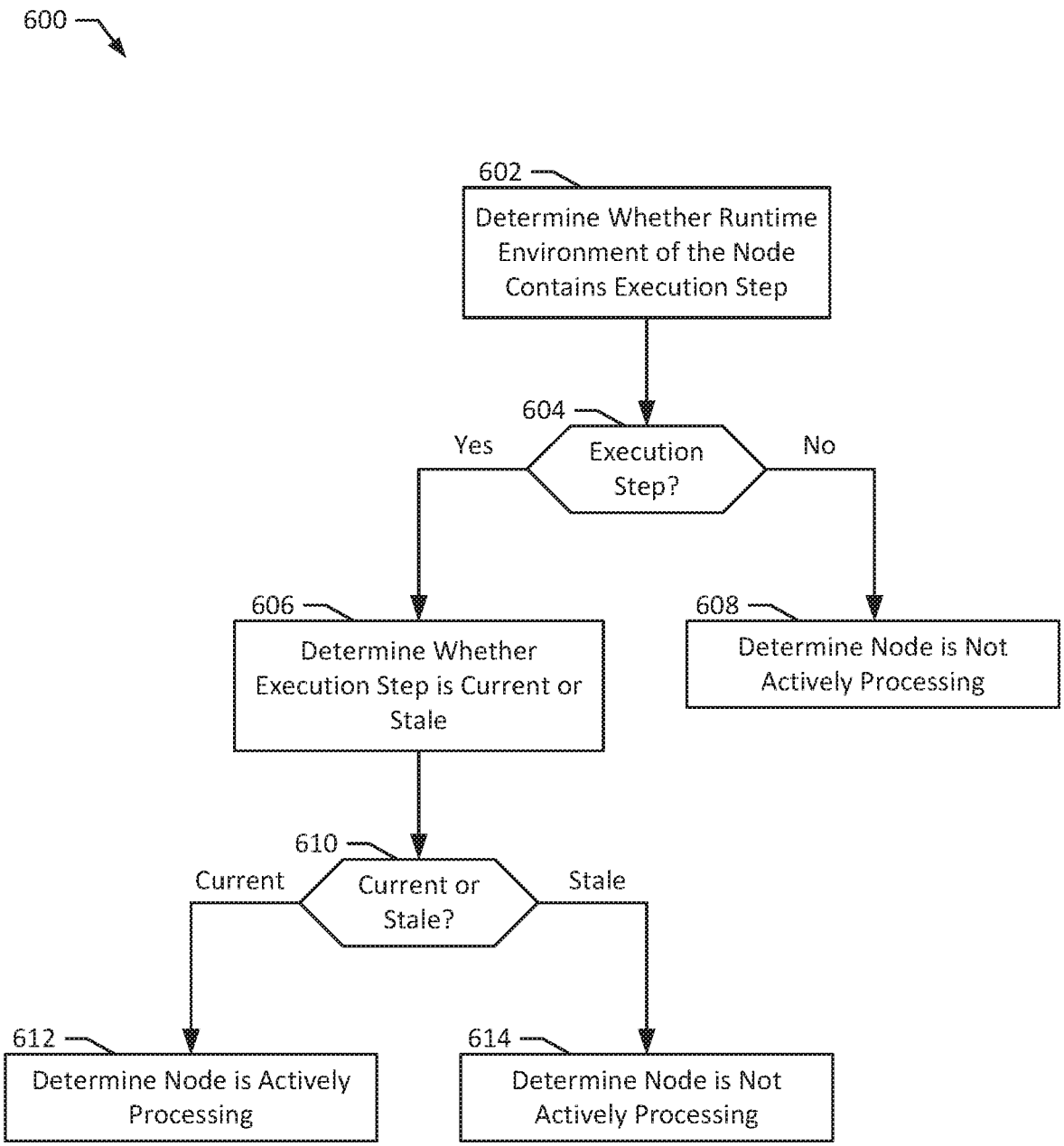
FIG. 6 illustrates a method for determining whether a particular node is actively processing a job according to an exemplary embodiment of the present disclosure.

FIG. 6 depicts a method 600 according to an exemplary embodiment of the present disclosure. The method 600 may be performed to determine whether a node 102, 104, 106 is actively processing a job 146, 152, 302. For example, the method 600 may be performed by a node 102, 104, 106 at blocks 408, 410 of the method 400 and corresponding blocks 516, 518, 536, 538 of the methods 510, 530. The method 600 may be implemented on a computer system, such as the system 100. For example, the method 600 may be implemented by the nodes 102, 104, 106. The method 600 may also be implemented by a set of instructions stored on a computer readable medium that, when executed by a processor, cause the computer system to perform the method. For example, all or part of the method 600 may be implemented by the CPUs 118, 130, 138 and the memories 120, 132, 140. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional. In particular, in certain instances, blocks 606, 610, 614 may be optional. In particular, in certain implementations, rather than proceeding to block 606, the method 600 may proceed directly to block 612.

The method 600 begins with determining whether the runtime environment of the node contains an execution step (block 602). For example, the node 102, 104, 106 may determine whether its runtime environment 108, 122, 134 includes steps 110, 112, 124 of the job 146, 152, 302 whose status is being determined. In making this determination, the node 102, 104, 106 may query the runtime environment 108, 122, 134 for steps 110, 112, 124 being executed by the node 102, 104, 106. The node 102, 104, 106 may then determine whether the steps 110, 112, 124 being executed within the runtime environment 108, 122, 134 correspond to the job 146, 152, 302 whose status is being determined (e.g., by analyzing the steps 110, 112, 124 for an indication of the corresponding job 146, 152, 302).

If the node determines that there are no execution steps in the runtime environment (block 604), the node may determine that the node is not actively processing the job (block 608). For example, if the node 102, 104, 106 determines that there are no steps 110, 112, 124 in the runtime environment 108, 122, 134, the node 102, 104, 106 may determine that the node 102, 104, 106 is not actively processing the job 146, 152, 302. For instance, the node 106 is idle and therefore includes no steps 110, 112, 124 within the runtime environment 134. Therefore, at blocks 604 and 608, the node 106 will determine that the node 106 has no steps 110, 112, 124 in the runtime environment 134 is therefore not actively processing the job 146, 152, 302. In another example, although the node 104 has a step 124 in the runtime environment 122, the step 124 may not correspond to the job 146, 152, 302 whose status is being requested. For example, if the node 104 received a request for the execution status of job 146, but is executing step 124 of the job 152, the node 104 may determine that the runtime environment 122 does not contain a step of the job 146 and therefore may determine that the node 104 is not actively processing the job 146.

If, on the other hand, the node determines that there are execution steps in the runtime environment (block 604), the node may determine whether the execution step is current or stale (block 606). For example, if the node 102, 104, 106 determines that there is at least one step 110, 112, 124 in the runtime environment 108, 122, 134 corresponding to the job 146, 152, 302, the node 102, 104, 106 may then determine whether the step 110, 112, 124 is current or stale. In certain implementations, the node 102, 104, 106 may determine whether the step 110, 112, 124 is stale based on an update time of the step 110, 112, 124. For example, the runtime environment 108, 122, 134 may maintain update times of the step 110, 112, 124 within the local status 116, 128, similar to the update time 308. The node 102, 104, 106 may check the local status 116, 128 for an update time of the step 110, 112, 124. If the update time is recent enough, the node 102, 104, 106 may determine that the step 110, 112, 124 is current. This determination may be made based on a predetermined threshold (e.g., 5 minutes, 10 minutes, 1 hour). Relatedly, if the update time is not recent enough, the node 102, 104, 106 may determine that the step 110, 112, 124 is stale. The node 102, 104, 106 may also make this determination based on an execution status of the step 110, 112, 124. For example, if the local status 116, 128 indicates that the step 110, 112, 124 is currently processing, the node 102, 104, 106 may determine that the step 110, 112, 124 is current. On the other hand, if the local status 116, 128 indicates that the node 102, 104, 106 has completed its execution of the step 110, 112, 124, the node 102, 104, 106 may determine that the step 110, 112, 124 is stale.

The node 102, 104, 106 may make this determination to ensure that the actively processing determination is made on up-to-date information. For example, if the node 104 begins executing the job 152 with the execution step 124 briefly before (e.g., less than 5 minutes before) beginning the method 600, it may be desirable for the node 104 to determine that it is still actively processing the job 152 based on the presence of the execution step 124 in the runtime environment 122. Relying on the actively processing determination and the local status 128 may expedite execution status determination by avoiding the need to consult the job processing data 154 stored in the repository 144. If, on the other hand, the node 104 began executing the job 152 an hour before performing the method 600 and has not updated the local status 128 since, it may be desirable to consult the job processing data 154 in spite of the increased delay. For instance, the local status 128 may be outdated (e.g., the job 152 may have completed execution) and it may be worth the additional processing delays to ensure up-to-date execution statuses are determined (e.g., in response to a user or system request or prior to adding the node 104 to the execution of the job 152).

If the node determines that the step is stale (block 610), the node may determine that the node is not actively processing (block 614). For example, if the node 102, 104, 106 determines that the step 110, 112, 124 is stale, the node 102, 104, 106 may determine that the node 102, 104, 106 is not actively processing the job 146, 152, 302. In such instances, processing may proceed to, e.g., block 414 of the method 400.

If the node determines that the step is current (block 610), the node may determine that the node is actively processing (block 614). For example, if the node 102, 104, 106 determines that the step 110, 112, 124 is current, the node 102, 104, 106 may determine that the node 102, 104, 106 is actively processing the job 146, 152, 302. In such instances, processing may proceed to, e.g., block 412 of the method 400.

Figure 7:
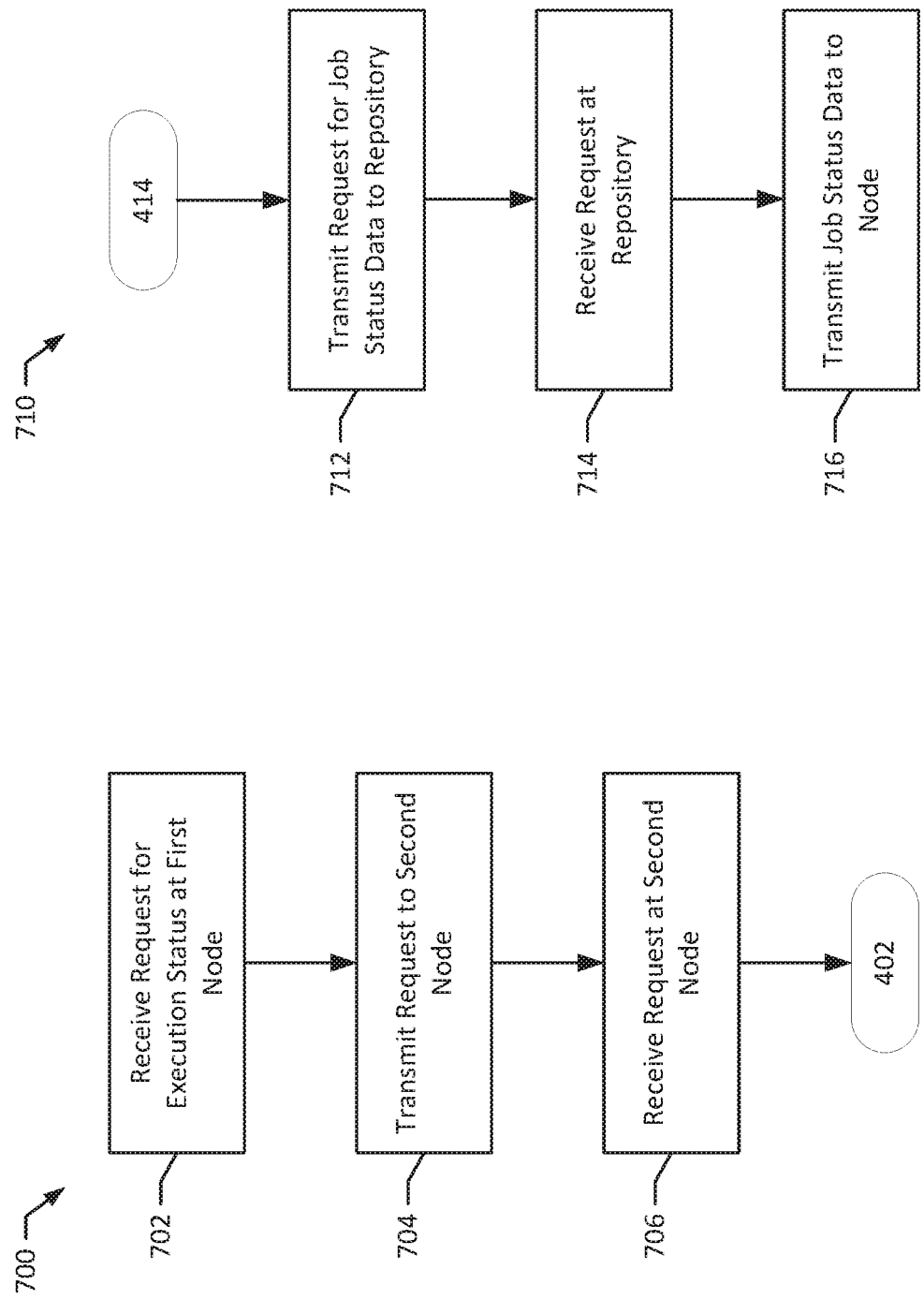
FIGS. 7A-7B illustrate methods for processing job status requests and/or retrieving job status data according to exemplary embodiments of the present disclosure.

FIGS. 7A and 7B depict methods 700, 710 according to exemplary methods of the present disclosure. The method 700 may be performed to process job status requests received at one node 102, 104, 106 for processing by another node 102, 104, 106. The method 710 may be performed to retrieve job status data 148, 154, 306 from a repository 144. In certain implementations, the methods 700, 710 may be performed in conjunction with the method 400. For example, the method 700 may be performed before performing the method 400 and the method 710 may be performed after performing the method 400. The methods 700, 710 may be implemented on a computer system, such as the system 100. For example, the methods 700, 710 may be implemented by the nodes 102, 104, 106 and/or the repository 144. The methods 700, 710 may also be implemented by a set of instructions stored on a computer readable medium that, when executed by a processor, cause the computer system to perform the method. For example, all or part of the methods 700, 710 may be implemented by the CPUs 118, 130, 138 and the memories 120, 132, 140. Although the examples below are described with reference to the flowchart illustrated in FIGS. 7A and 7B, many other methods of performing the acts associated with FIGS. 7A and 7B may be used. For example, the order of some of the blocks may be changed, certain blocks may be combined with other blocks, one or more of the blocks may be repeated, and some of the blocks described may be optional.

In FIG. 7A, the method 700 begins with receiving a request for an execution status at a first node (block 702). For example, a first node 102, 104, 106 may receive a request for the execution status of a job 146, 152, 302 from a user or a system process. The request may specify an identifier of the job 146, 152, 302, such as a job id.

The first node may then transmit the request to a second node (block 704). For example, the first node 102, 104, 106 may transmit the request to a second node 102, 104, 106 responsible for executing the job 146, 152, 302 whose execution status is requested. For example, the node 106 may receive a request for the execution status of the job 146, but is not executing the job 146. Accordingly, the node 106 may transmit the request to the node 102, which may be executing at least a part of the job 146. The request may be transmitted via the network 142, or, in implementations where the nodes 102, 104, 106 are separately connected, via the separate connection (e.g., local area connection) between the nodes 102, 104, 106.

The second node may then receive the request (block 706). Continuing the above example, the second node 102 may receive the request and proceed with processing the request according to the method 400 (e.g., by proceeding to block 402 of the method 400).

In FIG. 7B, the method 710 begins with a node transmitting a request for job status data to a repository (block 712). For example, the node 102, 104, 106 may transmit a request for job status data 150, 156, 306 to the repository 144 that identifies the job 146, 152, 302 for which job status data 150, 156, 306 is requested. For example, after arriving at block 414 in the method 400, the node 102, 104, 106 may transmit the request to the repository 144 to retrieve job status data 150, 156, 306 from the repository 144 if the local status 116, 128 is not up-to-date.

The method 710 may then proceed with receiving the request at the repository (block 714). For example, the repository 144 may receive the request from the node 102, 104, 106 via the network 142. The repository may then transmit the job status data to the node (block 716). For example, the repository 144 may transmit the job status data 150, 156, 306 to the node 102, 104, 106 via the network 142. In particular, the repository 144 may transmit the job status data 150, 156, 306 corresponding to the job 146, 152, 302 identified in the request. In certain implementations, the repository 144 may transmit the job status data 150, 156 as part of the job processing data 148, 154, 304.

Figure 8:
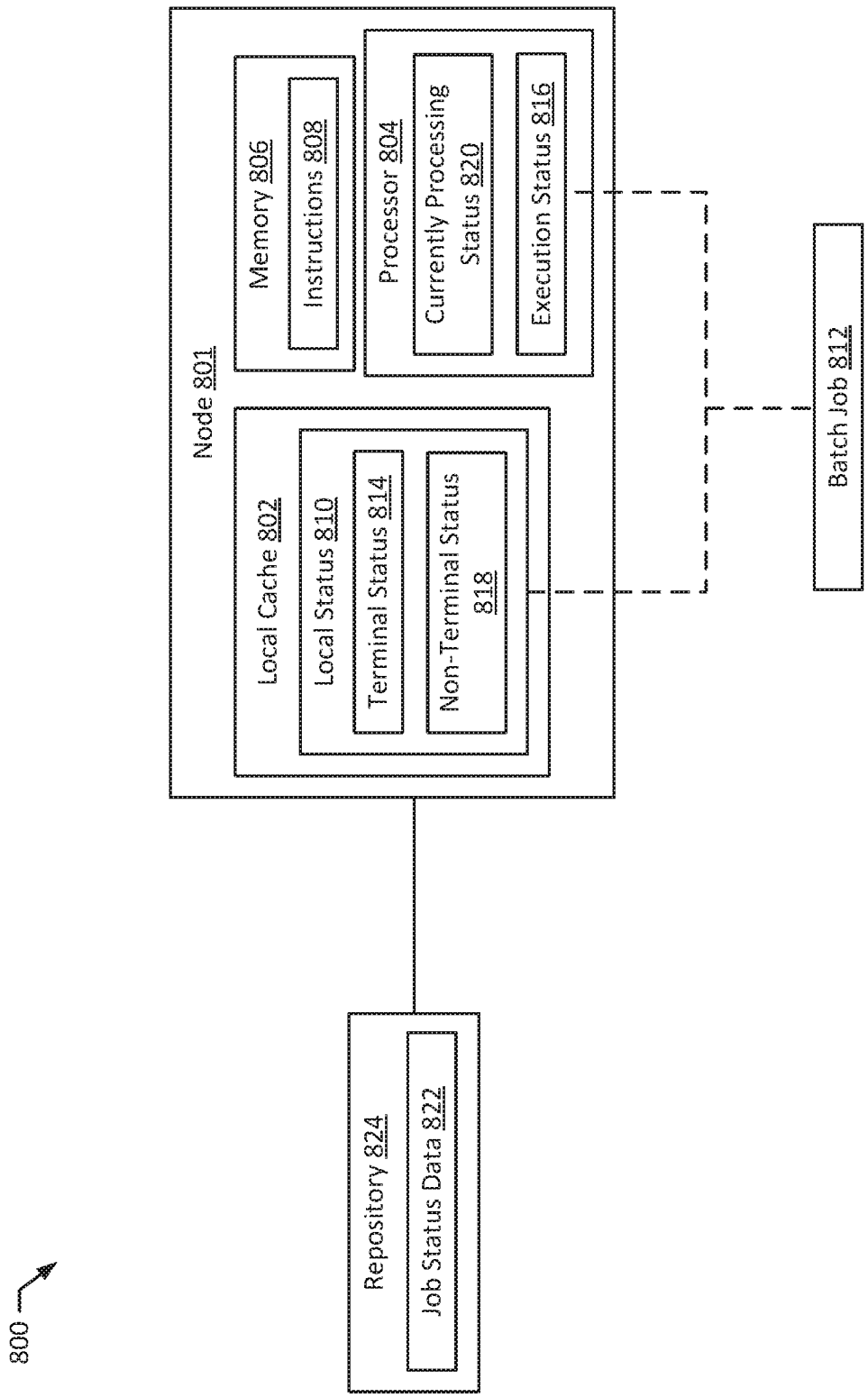
FIG. 8 illustrates a system according to an exemplary embodiment of the present disclosure.

FIG. 8 depicts a system 800 according to an exemplary embodiment of the present disclosure. The system 800 includes a node 801, which includes a local cache 802, a processor 804, and a memory 806. The memory 806 stores instructions 808 which, when executed by the processor 804, cause the processor 804 to check the local cache 802 for a local status 810 of a batch job 812. The instructions 808, when executed by the processor 804, may also cause the processor 804 to, responsive to the local status 810 indicating a terminal status 814 for the batch job 812, determine the terminal status 814 as an execution status 816 of the batch job 812 and/or, responsive to the local status 810 indicating a non-terminal status 818 for the batch job 812, determine whether the node 800 is actively processing at least a portion of the batch job 812. The instructions 808, when executed by the processor 804, may also cause the processor 804 to, responsive to determining that the node 800 is actively processing the batch job 812, determine a currently processing status 820 as the execution status 816 of the batch job 812 and, responsive to determining that the node 800 is not actively processing the batch job 812, retrieve job status data 822 from a repository 824 and determine the execution status 816 of the batch job 812 from the job status data 822.

Other computer system designs and configurations may also be suitable to implement the systems and methods described herein. The following examples illustrate various implementations in accordance with one or more aspects of the present disclosure.

Example 1 is a method comprising checking, at a node, a local cache of the node for a local status of a batch job, responsive to the local status indicating a terminal status for the batch job, determining the terminal status as an execution status of the batch job, and/or, responsive to the local status indicating a non-terminal status for the batch job, determining whether the node is actively processing at least a portion of the batch job. The method may further include, responsive to determining that the node is actively processing the batch job, determining a currently processing status as the execution status of the batch job and, responsive to determining that the node is not actively processing the batch job, retrieving job status data from a repository and determining the execution status of the batch job from the job status data.

Example 2 is the method according to Example 1, further comprising receiving a request at the node for the execution status of the batch job before checking the local cache of the node and returning the execution status of the batch job after determining the execution status.

Example 3 is the method according to either Example 1 or 2, further comprising, responsive to determining that the node lacks one or both of the local cache and the local status of the batch job, retrieving job status data from the repository and determining the execution status of the batch job from the job status data.

Example 4 is the method according to any of the previous Examples, wherein determining whether the node is actively processing at least a portion of the batch job includes determining whether a runtime environment of the node contains an execution step of the batch job.

Example 5 is the method according to Example 4, further comprising, responsive to determining that the runtime environment contains an execution step of the batch job, determining that the node is actively processing at least a portion of the batch job, and, responsive to determining that the runtime environment lacks an execution step of the batch job, determining that the node is not actively processing the batch job.

Example 6 is the method according to Example 4, further comprising, responsive to determining that the runtime environment contains the execution step of the batch job, determining whether the execution step is current or stale and, responsive to determining that the execution step is stale, determining that the node is not actively processing the batch job. The method may further include, responsive to determining that the execution step is current, determining that the node is actively processing the batch job.

Example 7 is the method according to example 2, wherein the request is initiated at a user's request.

Example 8 is the method according to Example 2, wherein the request is received from an additional node.

Example 9 is the method according to Example 8, wherein the additional node is waiting for the node to finish processing the batch job.

Example 10 is the method according to any of the previous Examples, wherein the method is performed responsive to the node being added to an execution of the batch job.

Example 11 is the method according to any of the previous Examples, wherein the job status data is retrieved from the repository via a network connection between the repository and the node.

Example 12 is the method according to any of the previous Examples, wherein the job status data is retrieved as a portion of job processing data received from the repository.

Example 13 is the method according to Example 12, wherein the job processing data includes the job status data and at least one of: an update time of the job status data, an indication of one or more execution steps associated with the batch job, a current execution step of the batch job, and statistics associated with at least a portion of the batch job.

Example 14 is the method according to any of the previous Examples, wherein the terminal status includes at least one of a completed status, a stopped status, a failed status, and an abandoned status.

Example 15 is the method according to any of the previous Examples, wherein the non-terminal status includes at least one of a starting status, a started status, and a stopping status.

Example 16 is a node comprising a local cache, a processor, and a memory. The memory may store instructions which, when executed by the processor, cause the processor to check the local cache for a local status of a batch job and, responsive to the local status indicating a terminal status for the batch job, determine the terminal status as an execution status of the batch job. The memory may also store further instructions which, when executed by the processor, cause the processor to, responsive to the local status indicating a non-terminal status for the batch job, determine whether the node is actively processing at least a portion of the batch job and, responsive to determining that the node is actively processing the batch job, determine a currently processing status as the execution status of the batch job. The memory may store still further instructions which, when executed by the processor, cause the processor to, responsive to determining that the node is not actively processing the batch job, retrieve job status data from a repository and determine the execution status of the batch job from the job status data.

Example 17 is the node of Example 16, wherein the memory stores further instructions which, when executed by the processor, cause the processor to receive a request at the node for the execution status of the batch job before checking the local cache of the node, and return the execution status of the batch job after determining the execution status.

Example 18 is the node according to Examples 16 or 17, wherein the memory stores further instructions which, when executed by the processor, cause the processor to, responsive to determining that the local cache lacks the local status of the batch job, retrieve job status data from the repository.

Example 19 is the node according to any of Examples 16 to 18, wherein the memory stores further instructions which, when executed by the processor while determining whether the node is actively processing at least a portion of the batch job, cause the processor to determine whether a runtime environment of the node contains an execution step of the batch job.

Example 20 is the node according to Example 19, wherein the memory stores further instructions which, when executed by the processor while determining whether the node is actively processing at least a portion of the batch job, cause the processor to, responsive to determining that the runtime environment contains an execution step of the batch job, determine that the node is actively processing at least a portion of the batch job and, responsive to determining that the runtime environment lacks an execution step of the batch job, determine that the node is not actively processing the batch job.

Example 21 is the node according to Example 19, wherein the memory stores further instructions which, when executed by the processor, cause the processor to, responsive to determining that the runtime environment contains an execution step of the batch job, determine whether the execution step is current or stale, and, responsive to determining that the execution step is stale, determine that the node is not actively processing the batch job. The memory may store still further instructions which, when executed by the processor, cause the processor to, responsive to determining that the execution step is current, determine that the node is actively processing the batch job.

Example 22 is a non-transitory, computer-readable medium storing instructions which, when executed by a processor, cause the processor to check, via a node, a local cache of the node for a local status of the batch job, responsive to the local status indicating a terminal status for the batch job, determine the terminal status as an execution status of the batch job, and/or, responsive to the local status indicating a non-terminal status for the batch job, determine whether the node is actively processing at least a portion of the batch job. The non-transitory, computer-readable medium may store further instructions which, when executed by the processor, cause the processor to, responsive to determining that the node is actively processing the batch job, determine a currently processing status as the execution status of the batch job, and, responsive to determining that the node is not actively processing the batch job, retrieve job status data from a repository and determine the execution status of the batch job from the job status data.

Example 23 is a system comprising a plurality of nodes comprising at least a first and second node, wherein the plurality of nodes are configured to execute batch jobs and a repository configured to store job status data regarding batch jobs. The first node may be configured to receive, from a user, a request for an execution status of a batch job and transmit the request for the execution status of the batch job to the second node. The second node may be configured to check a local cache of the second node for a local status of the batch job, determine that the local status indicates a terminal status of the batch job, determine that the node is not actively processing at least a portion of the batch job, and transmit a request for job status data to the repository. The repository may be configured to receive the request for job status data from the second node and transmit job status data to the second node indicating the execution status of the batch job.

Example 24 is the system of Example 23, wherein the second node is further configured to transmit the execution status of the batch job to the first node after determining the execution status.

Example 25 is the system of either of Examples 23 and 24, wherein the second node is further configured to responsive to determining that the local cache lacks the local status of the batch job, transmit a request for job status data to the repository.

Example 26 is the system of any of Examples 23 to 25, wherein, when determining whether the node is actively processing at least a portion of the batch job, the second node is further configured to determine whether a runtime environment of the node contains an execution step of the batch job.

Example 27 is the system of Example 26, wherein the second node is further configured to, responsive to determining that the runtime environment contains an execution step of the batch job, determine that the node is actively processing at least a portion of the batch job, and, responsive to determining that the runtime environment lacks an execution step of the batch job, determine that the node is not actively processing the batch job.

Example 28 is the system of Example 26, wherein the second node is further configured to, responsive to determining that the runtime environment contains an execution step of the batch job, determine whether the execution step is current or stale and, responsive to determining that the execution step is stale, determine that the node is not actively processing the batch job. The second node may be still further configured to, responsive to determining that the execution step is current, determine that the node is actively processing the batch job.

Example 29 is a method comprising receiving, at a first node, a request for an execution status of a batch job, transmitting the request for the execution status the batch job to a second node, and receiving the request for the execution status at the second node. The method may further include checking a local cache of the second node for a local status of the batch job, determining that the local status indicates a terminal status of the batch job, and determining that the node is not actively processing at least a portion of the batch job. The method may still further include transmitting a request for job status data to a repository, receiving, at the repository, the request for job status data, and transmitting job status data of the batch job to the second node indicating the execution status of the batch job.

Example 30 is a node comprising a cache checking means configured to check a local cache of the node for a local status of a batch job and a terminal status checking means. The terminal status checking means may be configured to determine whether the local status indicates a terminal status of the batch job, and responsive to determining that the local status indicates the terminal status, determine the terminal status as an execution status of the batch job. The node may also include an active processing checking means configured, responsive to the local status indicating a non-terminal status of the batch job, to determine whether the node is actively processing the batch job and, responsive to determining that the node is actively processing the batch job, determine a currently processing status as the execution status of the batch job. The system may further include a repository retrieval means configured, responsive to the active processing checking means determining that the node is not actively processing the batch job, to retrieve job status data from a repository and determine the execution status of the batch job from the job status data.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   receiving, at a node, a request for an execution status of a batch job before checking a local cache of the node;
   checking, at the node, the local cache of the node for a local status of the batch job, wherein the local status indicates a local state of execution of the batch job within the node;
   responsive to the local status indicating a non-terminal status for the batch job, determining whether the node is actively processing at least a portion of the batch job by:
     determining that a runtime environment of the node contains an execution step of the batch job; and
     determining, based on an update time of the execution step, whether the execution step is current or stale;
   responsive to determining that the node is actively processing the batch job, determining a currently processing status as the execution status of the batch job;
   responsive to determining that the node is not actively processing the batch job, retrieving batch job status data from a repository and determining the execution status of the batch job from the batch job status data, wherein the repository is separate from the node; and
   responsive to the local status indicating a terminal status for the batch job, determining the terminal status as an execution status of the batch job.

2. The method of claim 1, further comprising:
   returning the execution status of the batch job after determining the execution status.

3. The method of claim 1, further comprising:
   responsive to determining that the node lacks the local status of the batch job, retrieving the batch job status data from the repository and determining the execution status of the batch job from the job status data.

4. The method of claim 1, further comprising:
   responsive to determining that the runtime environment contains the execution step of the batch job, determining that the node is actively processing at least a portion of the batch job; and
   responsive to determining that the runtime environment lacks the execution step of the batch job, determining that the node is not actively processing the batch job.

5. The method of claim 1, further comprising:
   responsive to determining that the execution step is stale, determining that the node is not actively processing the batch job; and responsive to determining that the execution step is current, determining that the node is actively processing the batch job.

6. The method of claim 1, wherein the request is initiated at a user's request.

7. The method of claim 1, wherein the request is received from an additional node.

8. The method of claim 7, wherein the additional node is waiting for the node to finish processing the batch job.

9. The method of claim 1, wherein the method is performed responsive to the node being assigned to execute the batch job.

10. The method of claim 1, wherein the job status data of the batch job is retrieved as a portion of batch job processing data received from the repository, and wherein the job processing data includes the job status data and at least one of: an update time of the job status data, an indication of one or more execution steps associated with the batch job, a current execution step of the batch job, and job execution statistics associated with at least a portion of the batch job.

11. The method of claim 1, wherein the terminal status includes at least one of a completed status, a stopped status, a failed status, and an abandoned status.

12. The method of claim 1, wherein the non-terminal status includes at least one of a starting status, a started status, and a stopping status.

13. The node of claim 1, wherein the memory stores further instructions which, when executed by the processor while determining whether the node is actively processing at least a portion of the batch job, cause the processor to:
responsive to determining that the runtime environment contains an execution step of the batch job, determine that the node is actively processing at least a portion of the batch job; and
responsive to determining that the runtime environment lacks an execution step of the batch job, determine that the node is not actively processing the batch job.

14. The node of claim 1, wherein the memory stores further instructions which, when executed by the processor, cause the processor to:
responsive to determining that the execution step is stale, determine that the node is not actively processing the batch job; and
responsive to determining that the execution step is current, determine that the node is actively processing the batch job.

15. A node comprising:
a local cache;
a processor; and
a memory storing instructions which, when executed by the processor, cause the processor to:
receive a request for an execution status of a batch job before checking the local cache;
check the local cache for a local status of a batch job, wherein the local status indicates a local state of execution of the batch job within the node;
responsive to the local status indicating a non-terminal status for the batch job, determine whether the node is actively processing at least a portion of the batch job by:
determining whether a runtime environment of the node contains an execution step of the batch job; and
responsive to determining that the runtime environment contains the execution step of the batch job, determining, based on an update time of the execution step, whether the execution step is current or stale;
responsive to determining that the node is actively processing the batch job, determine a currently processing status as the execution status of the batch job;
responsive to determining that the node is not actively processing the batch job, retrieve batch job status data from a repository and determine the execution status of the batch job from the batch job status data, wherein the repository is separate from the node; and
responsive to the local status indicating a terminal status for the batch job, determine the terminal status as an execution status of the batch job.

16. The node of claim 15, wherein the memory stores further instructions which, when executed by the processor, cause the processor to:
return the execution status of the batch job after determining the execution status.

17. The node of claim 15, wherein the memory stores further instructions which, when executed by the processor, cause the processor to:
responsive to determining that the local cache lacks the local status of the batch job, retrieve the batch job status data from the repository.

18. A non-transitory, computer-readable medium storing instructions which, when executed by a processor, cause the processor to:
receive, at a node, a request for an execution status of a batch job before checking a local cache of the node;
check, via a node, the local cache of the node for a local status of the batch job, wherein the local status indicates a local state of execution of the batch job within the node;
responsive to the local status indicating a non-terminal status for the batch job, determine whether the node is actively processing at least a portion of the batch job by:
determining whether a runtime environment of the node contains an execution step of the batch job; and
responsive to determining that the runtime environment contains the execution step of the batch job, determining, based on an update time of the execution step, whether the execution step is current or stale;
responsive to determining that the node is actively processing the batch job, determine a currently processing status as the execution status of the batch job;
responsive to determining that the node is not actively processing the batch job, retrieve batch job status data from a repository and determine the execution status of the batch job from the batch job status data, wherein the repository is separate from the node; and
responsive to the local status indicating a terminal status for the batch job, determine the terminal status as an execution status of the batch job.

* * * * *